United States Patent
Cappellotto

(10) Patent No.: US 9,855,790 B2
(45) Date of Patent: Jan. 2, 2018

(54) METHOD FOR THE MANUFACTURE OF A SPOKE FOR SPOKED WHEELS, SPOKE FORMING MACHINE AND SPOKE OBTAINED WITH SAID METHOD

(71) Applicant: Alpina Raggi S.p.A., Lomagna (LC) (IT)

(72) Inventor: Guido Cappellotto, Arcore (IT)

(73) Assignee: ALPINA RAGGI S.P.A., Lomanga (LC) (IT)

( * ) Notice: Subject to any disclaimer, the term of this patent is extended or adjusted under 35 U.S.C. 154(b) by 285 days.

(21) Appl. No.: 14/372,487

(22) PCT Filed: Jan. 16, 2013

(86) PCT No.: PCT/IB2013/050391
§ 371 (c)(1),
(2) Date: Jul. 16, 2014

(87) PCT Pub. No.: WO2013/108186
PCT Pub. Date: Jul. 25, 2013

(65) Prior Publication Data
US 2014/0361604 A1    Dec. 11, 2014

(30) Foreign Application Priority Data

Jan. 18, 2012 (IT) .............................. PD2012A0013

(51) Int. Cl.
*B21H 1/00* (2006.01)
*B21D 53/86* (2006.01)
(Continued)

(52) U.S. Cl.
CPC ............ *B60B 1/0261* (2013.01); *B21D 53/86* (2013.01); *B21F 39/00* (2013.01); *B21H 1/00* (2013.01);
(Continued)

(58) Field of Classification Search
CPC .......... Y10T 29/4952; Y10T 29/49522; B21F 5/00–5/005; B21F 39/00; B60B 1/003;
(Continued)

(56) References Cited

U.S. PATENT DOCUMENTS 1,816,940 A * 8/1931 Stoler .................... B21F 39/00
72/198
2003/0221471 A1* 12/2003 Arciniega .............. B21H 7/182
72/110
(Continued)

FOREIGN PATENT DOCUMENTS

DE    196 50 891 A1    8/1997
DE    101 46 230 C1    3/2003
EP    0 794 071 A2    9/1997

OTHER PUBLICATIONS

Cort, Adam; "Orbital and Radial Forming"; Dec. 1, 2002; Assembly Magazine; accessed Jan. 6, 2017; http://www.assemblymag.com/articles/82893-orbital-and-radial-forming.*

(Continued)

*Primary Examiner* — Christopher Besler
*Assistant Examiner* — Matthew P Travers
(74) *Attorney, Agent, or Firm* — RatnerPrestia

(57) ABSTRACT

The method for the manufacture of a spoke for spoked wheels including a step of forming a head of the spoke at a longitudinal end of the shank thereof by equipment for the plastic deformation of the end of the shank, wherein the plastic deformation is obtained by maintaining the shank in relative rotation to the equipment.

4 Claims, 3 Drawing Sheets

(51) Int. Cl.
   *B21F 39/00*   (2006.01)
   *B60B 1/02*    (2006.01)
   *B60B 1/04*    (2006.01)
   *B21J 9/02*    (2006.01)
   *B60B 1/00*    (2006.01)

(52) U.S. Cl.
   CPC .............. *B21J 9/025* (2013.01); *B60B 1/003* (2013.01); *B60B 1/045* (2013.01); *B60B 2310/20* (2013.01); *B60B 2310/206* (2013.01); *B60B 2310/2082* (2013.01); *B60B 2310/224* (2013.01); *B60B 2900/212* (2013.01); *B60Y 2200/13* (2013.01); *Y10T 29/49492* (2015.01); *Y10T 29/49522* (2015.01)

(58) Field of Classification Search
   CPC .............. B60B 1/006; B60B 2310/208; B60B 2310/2082; B60B 2310/224; B60B 2310/213; B21K 1/34; B21J 9/025; B21H 1/00; B21H 1/18; B21H 7/182; B21G 3/12; B21G 3/30
   USPC ....... 72/74, 76, 112, 115, 125, 126, 477, 86, 72/110
   See application file for complete search history.

(56) References Cited

U.S. PATENT DOCUMENTS

| | | | |
|---|---|---|---|
| 2005/0161998 A1* | 7/2005 | Passarotto | B60B 1/003 301/61 |
| 2005/0173971 A1* | 8/2005 | Passarotto | B60B 1/003 301/104 |
| 2009/0038157 A1* | 2/2009 | Kruse | B21H 1/00 29/898.052 |
| 2012/0242139 A1 | 9/2012 | Cappellotto | |

OTHER PUBLICATIONS

International Search Report for PCT/IB2013/050391 dated May 7, 2013.

* cited by examiner

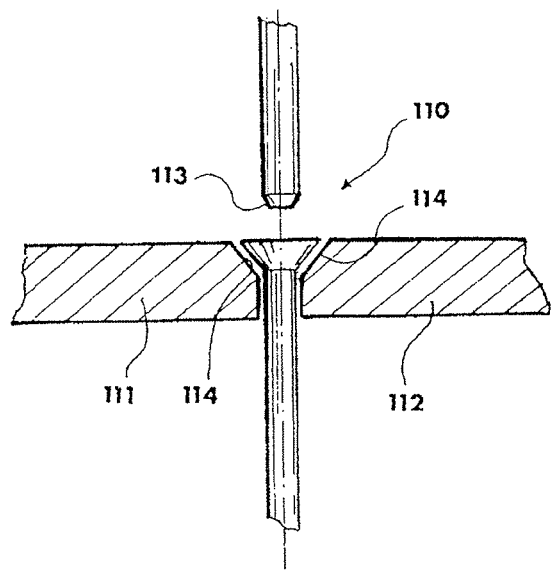
FIG.2
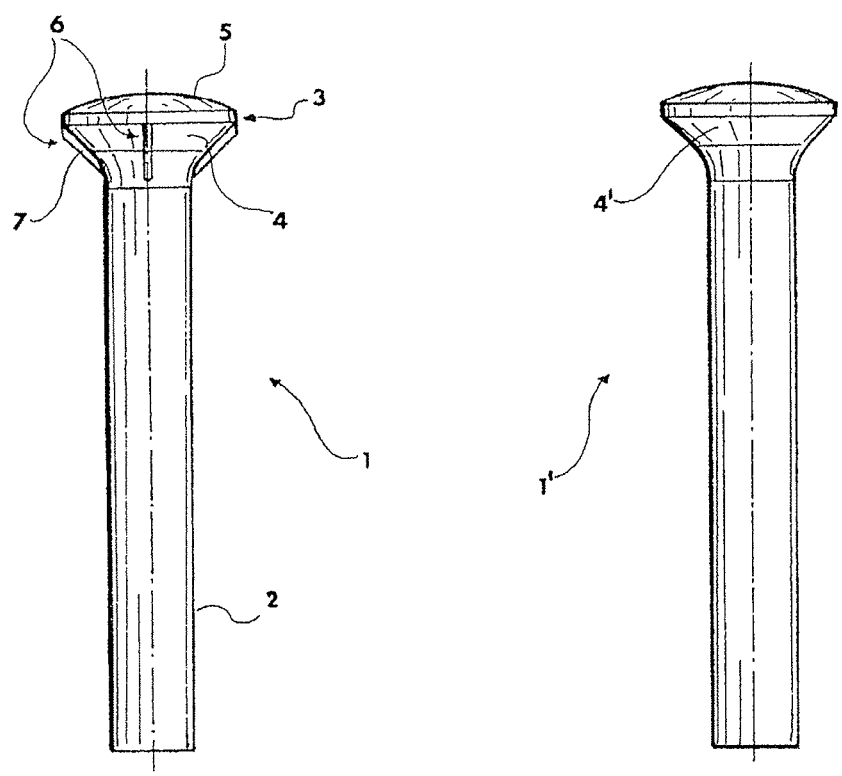
FIG.3
PRIOR ART
FIG.4

METHOD FOR THE MANUFACTURE OF A SPOKE FOR SPOKED WHEELS, SPOKE FORMING MACHINE AND SPOKE OBTAINED WITH SAID METHOD

This application is the U.S. National Phase Application of PCT/IB2013/050391, filed Jan. 16, 2013, which claims priority to Italian Patent Application No. PD2012A000013, filed Jan. 18, 2012, the contents of such applications being incorporated by reference herein.

The object of the invention is a method for the manufacture of a spoke for spoked wheels including a step of forming a spoke head at a longitudinal end of a shank thereof wherein the forming is obtained by means of an equipment for the plastic deformation of the end of the shank.

In the specific technical field a spoke is produced starting from a piece of metal wire of appropriate length, at a longitudinal end of which a head is formed by plastic deformation of the material.

Since these items have prevalent longitudinal dimensions, the plastic deformation is generally obtained with so-called open matrix moulds, in which the matrix is obtained by two or more complementary elements that can be distanced from each other, on completion of the moulding, to facilitate the extraction of the semi-finished spoke with the formed head.

The use of open matrix moulds nevertheless results in the fact that some raised imperfections (so-called "tongues" or "flaps") may form on the under-head surface, i.e. on the surface that connects the head to the shank of the spoke, along the zones where the matrix elements join. This problem, also highlighted in patent application PD2009A000253 by the same applicant, is the cause of the focusing of efforts that may lead to breakage of the spoke at the zone where the head and shank join.

As previously explained, adopting open matrix moulds is a consequence of the significant longitudinal dimensions of the spoke with respect to section. Indeed the drawback arising from the fins could be overcome if it were possible to mould the heads of the spoke with closed matrix moulds such as for example is the case in the the production of nipples for spoked wheels or in the production of tie rods or bolts. However this technology is not easily transferable to the spokes as the spoke is much more slender than a nipple and would not be easy to extract from a closed matrix following moulding since it would inevitably bend if point-loaded for extraction.

The technical problem at the basis of the present invention is therefore that of making available a method for the manufacture of a spoke and a spoke thus obtained structurally and functionally designed to allow all the above-reported drawbacks with reference to the aforementioned prior art to be overcome.

This problem is addressed and resolved by the invention by means of a method in accordance with the appended claims.

The characteristics and the advantages of the invention will become clearer from the detailed description of a preferred embodiment thereof, illustrated by way of a non-exhaustive example, with reference to the accompanying drawings, wherein:

FIG. 2 is a schematic view of a second processing spoke processing station according to the method of this invention;

FIG. 3 is a view of a detail of a spoke obtained with the known methods;

Figure 1A:
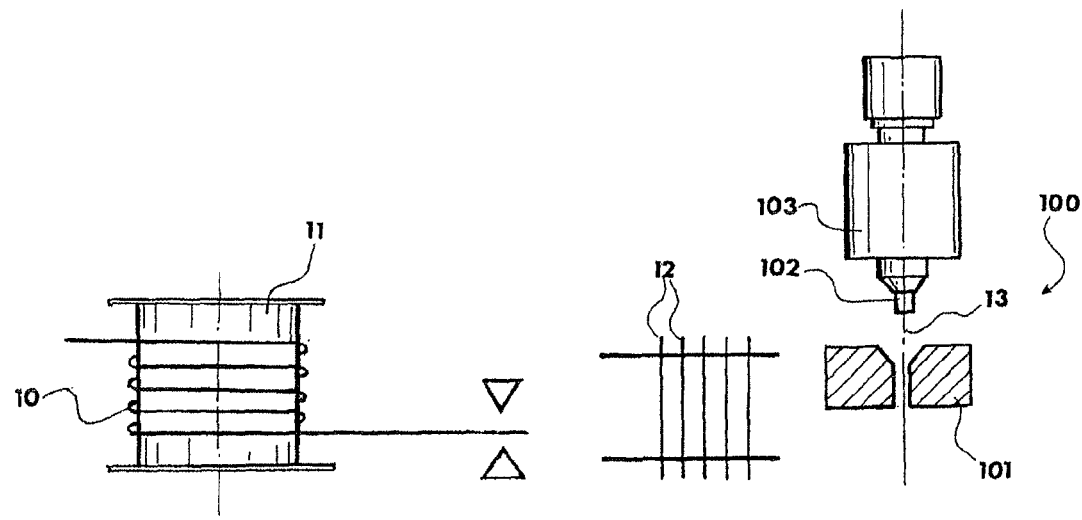
FIG. 1A is a schematic view of a first processing spoke processing station according to the method of this invention.

FIG. 4 and is a corresponding view thereof detail of FIG. 3 relating to a spoke obtained with the method of this invention.

With reference initially to FIG. 3, 1 globally indicates a spoke produced with known means. The spoke 1 comprises a shank 2 that is generally cylindrical and sharply elongated at one longitudinal end of which a head 3 is obtained by cold deformation. The head 3 comprises a under-head surface 4 facing the shank and an opposing cap 5. This spoke is generally produced by cold moulding with a so-called open matrix mould, i.e. the matrix of which is formed by two elements positioned next to each other. This is evidenced in that, once moulded, the spoke presents, at the level of the matrix closure lines, two surface imperfections 6, in the form of two projections or tongues 7, that are raised with respect to the general development of the truncated-cone under-head surface 4. These tongues 7 determine a localised support of the spoke head in the corresponding housing of a wheel rim and a consequent possible concentration of load when the spoke is subjected to strong tension.

In FIG. 4, 1' globally indicates a spoke produced with the method according to the present invention, which is substantially identical to the spoke 1 of known type except that the under-head surface 4' is perfectly smooth and free of surface irregularities. Thanks to this geometric characteristic, the spoke 1' presents improved resistance in that its head is continuously supported in the housing of the rim and is not subject to concentrated loads at the level of the tongues.

Figure 1B:
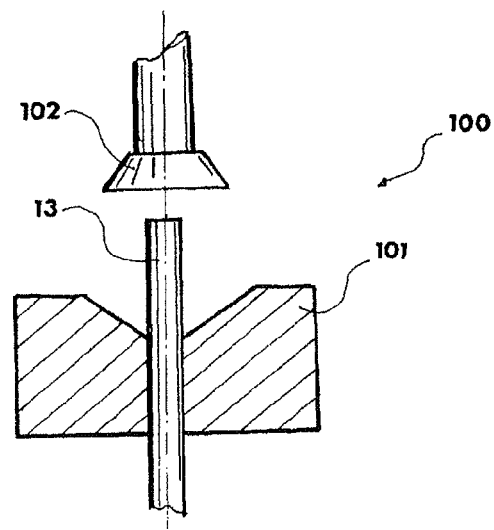
FIG. 1B is a schematic view of a detail of FIG. 1A.
Figure 1C:
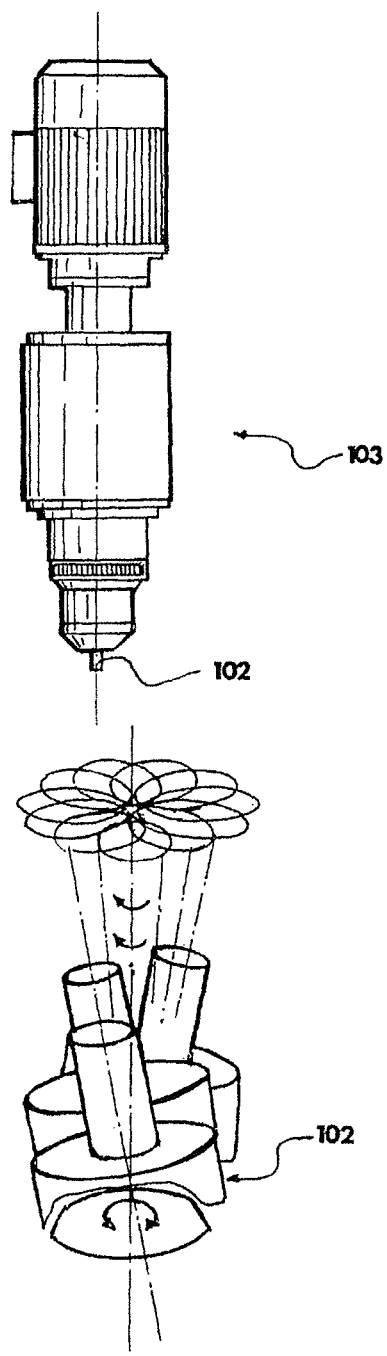
FIG. 1C is a schematic view of a tool of the station of the foregoing figures and of the movement thereby described.

The spoke of FIG. 4 is obtained starting from a wire coil 10 that is unwound from a reel 11 and cut to size into a series of segments 12 of predetermined length. The wire segments 12 are then laid onto a "pilgrim process" conveyor, parallel to each other and are spaced so as to be positioned in different processing stations among which the station of FIG. 1, for the forming of the spoke head and the station of FIG. 2 for the calibration of the head thus formed.

The forming station, globally indicated by 100, comprises a clamp 101, into which the spoke is positioned and gripped, thus allowing a free projection 13 of predetermined extension. The projection 13 is then placed next to a riveting tool 102 (punch) operated by a riveting unit 103 of a known type, such as a riveting unit that is commercially known by the name Baltec Radial manufactured by BalTec Maschinenbau AG. The tool 102 or punch is operated in a combined motion that describes an epicyclic "rosette" pattern (also called "rose-petal" path) illustrated in FIG. 1C combined with an axial percussion motion that produces an effective and, at the same time, delicate deformation, until definition of the head of the stroke in the typical, desired truncated cone shape. It will be noted that with this type of processing, contrary to what occurs with the open matrix moulding processing, the axial force employed to deform the head is relatively small and is exerted onto an equally small contact surface between the punch and the spoke head so that the yield point of the material to be riveted with with small forces can be reached. As a result of said "rosette" path, the material primarily deforms in a radial direction. The resulting effect is that, even adopting open matrix clamps 101, the possible formation of tongues or other surface imperfections in the under-head surface is fairly modest, if not null as there is no substantial flow of material in the joining zones of the mould matrix.

In FIG. 2, a calibration station is globally indicated by 110. It comprises a pair of counter-rotating gauging rollers 111, 112 and a rotating centre 113. The spoke is transported by the "pilgrim process" conveyor so as to position the shank between between the rollers 111 and 112 so that the under-head surface faces the respective conical surfaces 114 of the rollers. A system for the linear movement of the rollers (not shown) determines the symmetrical approach thereof towards the spoke head. The combined action of the pressure exerted by the surfaces 114 on the surface of the spoke beneath the head together with the free rotation of the spoke itself between the rollers determines the plastic moulding of the spoke head by removing any surface defect of eccentricity and form with respect to the shank. The spoke is then threaded by traditional methods.

It can be observed that the forming of the head in each of the stations 100 and 110, is obtained by means of an equipment for the plastic deformation of the end of the shank. This plastic deformation is obtained in both processings by maintaining the shaft in rotation with respect to the equipment, in the first case with a "rosette" movement of the punch in relation to the spoke head and in the second case by means of the free rotation of the spoke between the gauging rollers.

Although the optimal result of this invention is obtained by performing both the aforementioned processings in the sequence indicated, a similar result is however also achievable with just one of the two processings. For example, by using the second station to gauge the spoke between the gauging rollers, the spoke head could, at least in theory, be defined with a cold, open matrix moulding. The "tongues" and other surface imperfections that would thus be inevitably obtained could be eliminated in the subsequent gauging step between gauging rollers 111, 112.

In the same way, since the radial riveting processing with "rosette" movement allows a drastic reduction of the forces in play to obtain the plastic deformation of the spoke head, the generation of tongues on the under-head surface could be reduced and perhaps eliminated by limiting such forces, thanks to the reduction of the forces in play.

The invention is therefore susceptible to a number of modifications and variants, all of which fall under the same inventive concept as indicated in the following claims.

The invention claimed is:

1. A method for the manufacture of a spoke for spoked wheels including forming a head of said spoke at at least one longitudinal end of the shank thereof by means of an equipment for the plastic deformation of the end of the shank, the equipment comprising a calibration station which comprises a pair of counter-rotating gauging rollers and a rotating center; wherein said plastic deformation is obtained by maintaining the counter-rotating gauging rollers in rotation with a free rotation of the spoke between said counter-rotating gauging rollers and by holding the spoke against the surface of the counter-rotating gauging rollers by the rotating center urging on the at least one longitudinal end of the shank of the spoke.

2. The method for the manufacture of a spoke according to claim 1, wherein the equipment comprises a riveting tool, the plastic deformation of the end of the shank comprises radial riveting the end of the shank on which said head is to be formed by the riveting tool.

3. The method for the manufacture of a spoke according to claim 2, wherein said riveting step is carried out with relative movement of the spoke with respect to a riveting tool according to an epicyclical riveting rosette pattern.

4. The method for the manufacture of a spoke according to claim 1, in which the counter-rotating gauging rollers have respective conical surfaces facing the under-head surface of the spoke.

\* \* \* \* \*